June 1, 1926. 1,586,831
J. F. MURPHY
PIN SETTING MECHANISM
Filed July 6, 1925 4 Sheets-Sheet 1
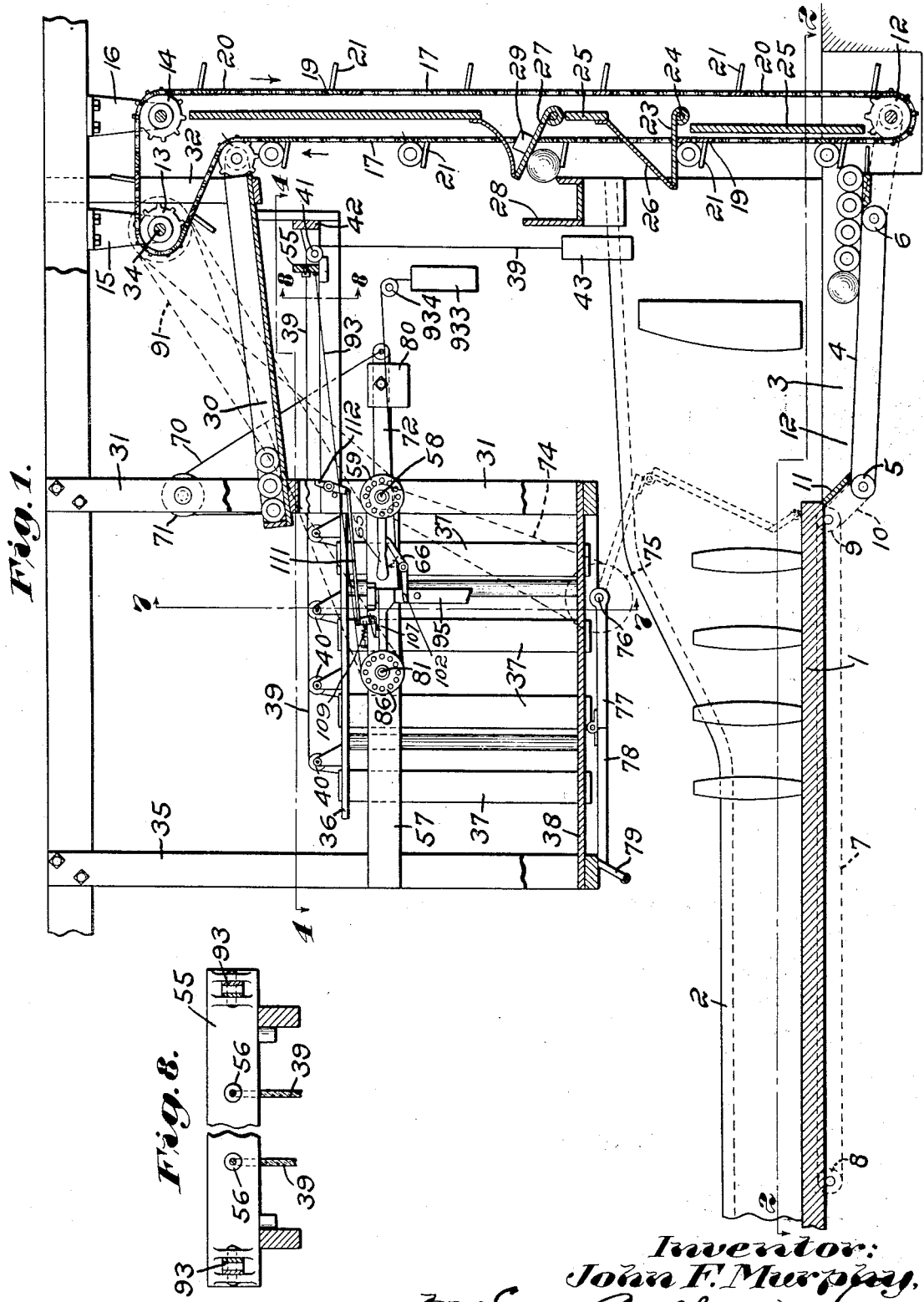
Inventor:
John F. Murphy, June 1, 1926.
J. F. MURPHY
1,586,831
PIN SETTING MECHANISM
Filed July 6, 1925
4 Sheets-Sheet 2
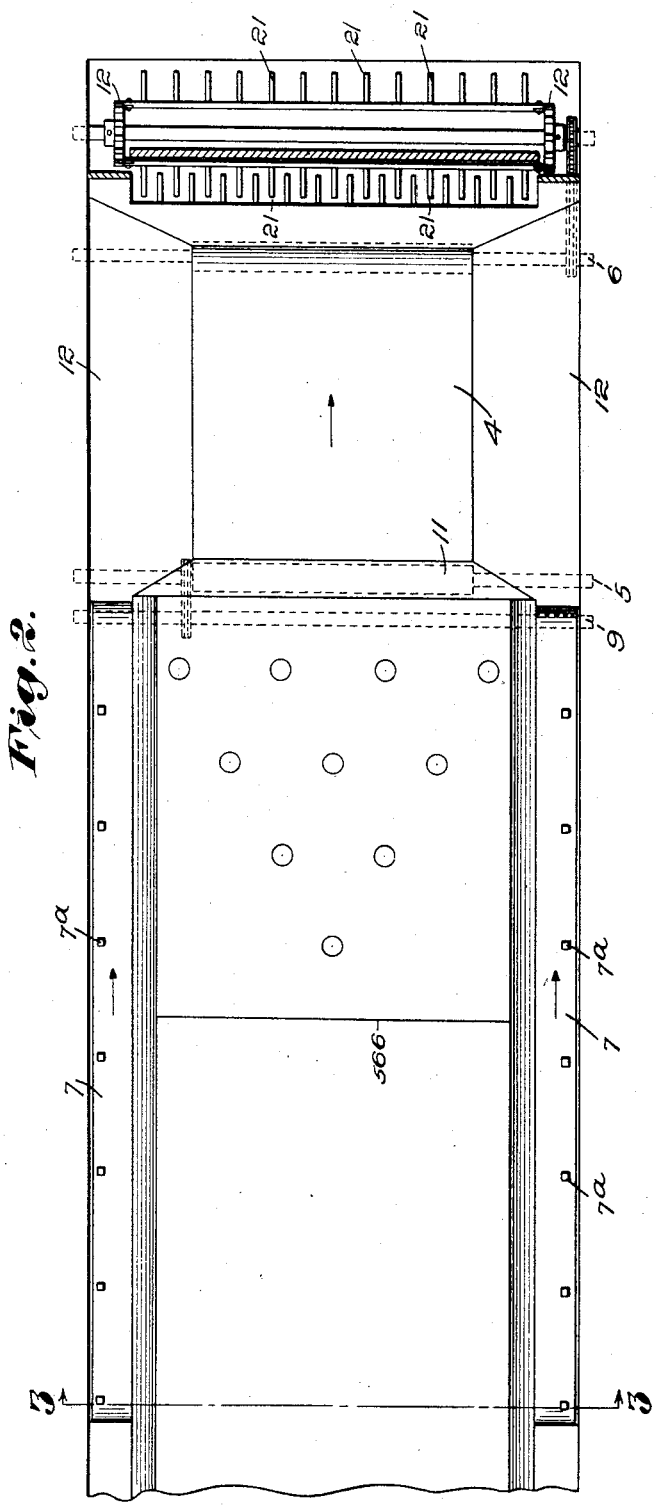
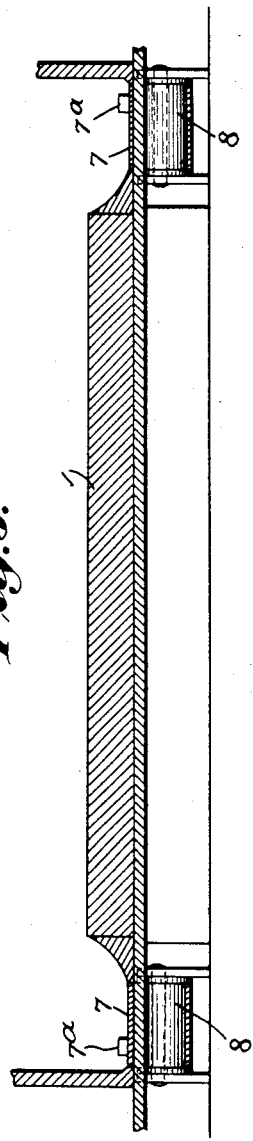
Inventor:
John F. Murphy, June 1, 1926.
J. F. MURPHY
1,586,831
PIN SETTING MECHANISM
Filed July 6, 1925
4 Sheets-Sheet 3
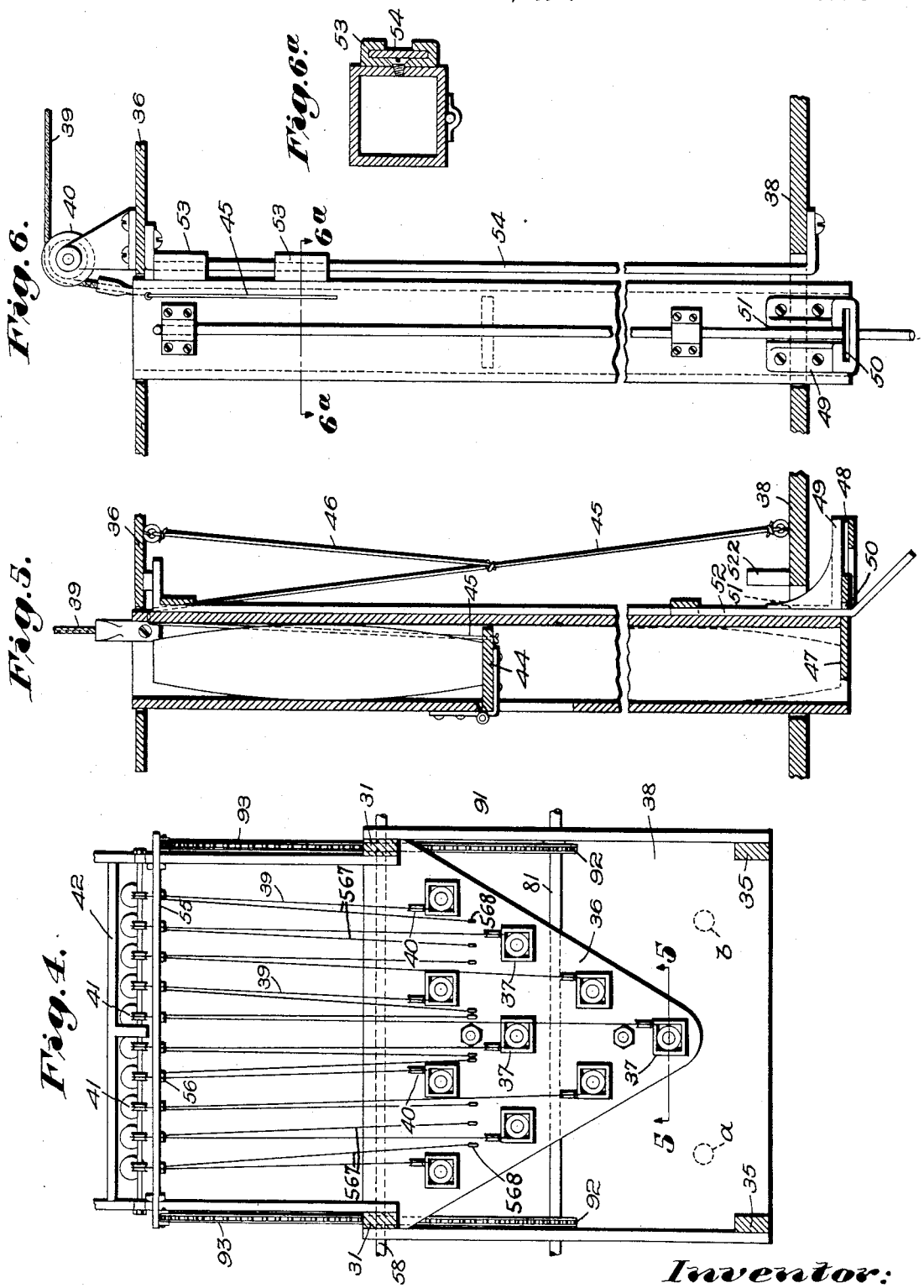
Inventor:
John F. Murphy June 1, 1926. 1,586,831
J. F. MURPHY
PIN SETTING MECHANISM
Filed July 6, 1925 4 Sheets-Sheet 4
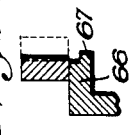
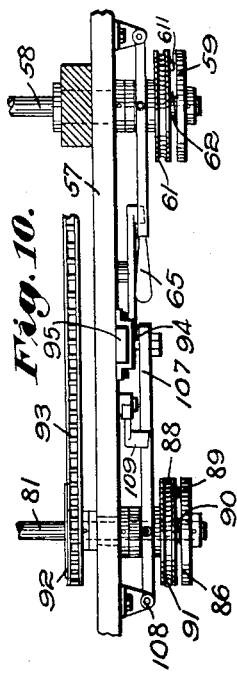
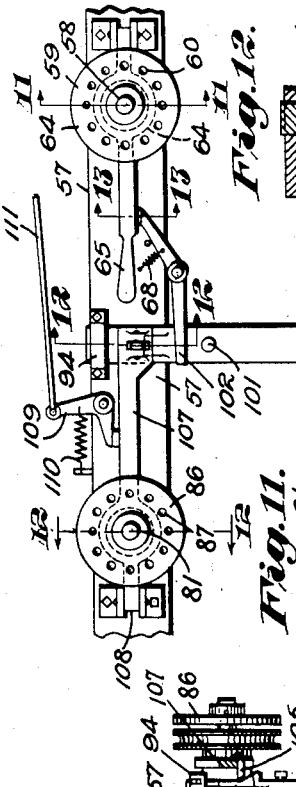
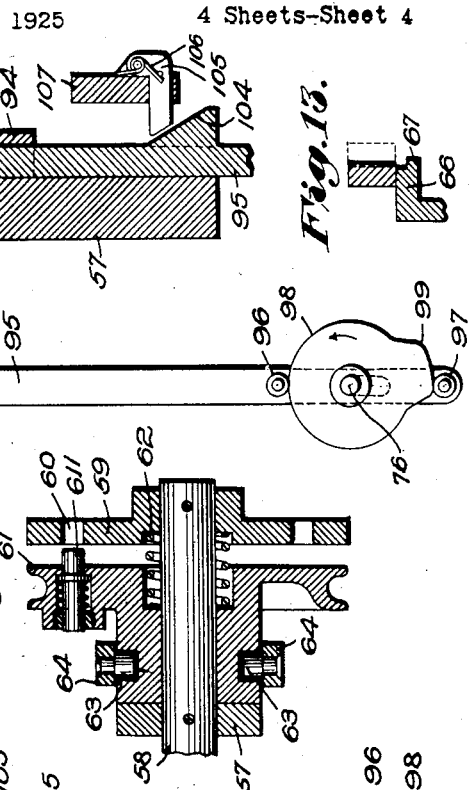
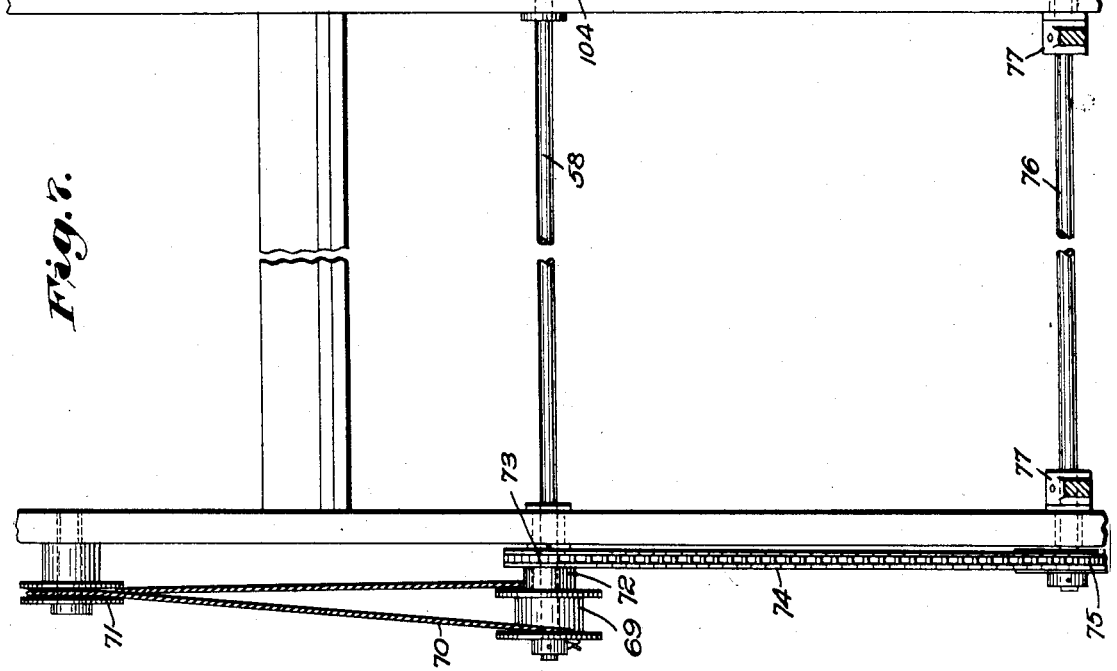
Inventor:
John F. Murphy, Patented June 1, 1926.

1,586,831

UNITED STATES PATENT OFFICE.

JOHN F. MURPHY, OF MIDDLEBORO, MASSACHUSETTS.

PIN-SETTING MECHANISM.

Application filed July 6, 1925. Serial No. 41,536.

This invention relates to pin setting mechanism for bowling alleys, and while particularly adapted for use with candle pins, may be used with any pins. My invention aims to provide an improved mechanism for that purpose and has, among others, the novel features hereinafter mentioned.

In the drawings of one embodiment of my invention selected for description and illustration herein, Fig. 1 is a side elevation, showing the rear end of the alley only, for convenience;

Fig. 2, a horizontal longitudinal section on the line 2—2, Fig. 1;

Fig. 3, a cross-section on the line 3—3, Fig. 2, from the left;

Fig. 4, a partial horizontal section on the line 4—4, Fig. 1, of that particular portion of the mechanism including the pin boxes, looking down;

Fig. 5, an enlarged vertical sectional detail of one of the pin boxes and immediate connections on the line 5—5, Fig. 4;

Fig. 6, a side detail view of the same parts;

Fig. 6ª, a cross-section on the line 6ª—6ª, Fig. 6;

Fig. 7, a partial vertical section on the line 7—7, Fig. 1;

Fig. 8, a vertical sectional detail on the line 8—8, Fig. 1;

Fig. 9, a partial side detail, on an enlarged scale, of the starting and stopping mechanism for the pin sweeping and pin box lowering device;

Fig. 10, a plan of the same parts;

Fig. 11, a vertical sectional detail, on an enlarged scale, of the clutch construction for the alley sweeping device on the line 11—11, Fig. 9;

Fig. 12, an enlarged detail of the pulley clutch starting mechanism for the pin box lowering means on the line 12—12, Fig. 9; and Fig. 13, an enlarged detail of the pulley clutch lever locking mechanism for the alley sweeping device on the line 13—13, Fig. 9.

Referring first to Fig. 1, the rear end of a conventional bowling alley floor is shown at 1, and the end of the usual ball track at 2. At the end of the alley is the pit 3, part of which, in this case, is made somewhat deeper than usual for reasons which will soon appear.

The bottom of the pit is inclined and preferably, as in this case, Fig. 1, comprises a travelling conveyor 4, of any suitable material, as canvas, supported by two or more rollers 5, 6, the roller 6 herein imparting motion to the conveyor which travels toward the rear of the alley by means of a construction to be described, so that normally the pins and balls, as they drop, are automatically carried to the rear end of the pit and to the pin and ball conveyor or elevator also to be described.

Just in advance of the conveyor 4, Figs. 1, 2, 3, on each side of the alley, in what are known as the gutters, is a narrow conveyor 7, carried by rollers 8, 9, the rollers 9 imparting motion to the conveyor end, Fig. 1, in turn being actuated by sprocket chains 10 from the shaft-carrying roller 5, to convey rearwardly to the conveyor 4 any balls or pins that may fall off the alley on either side, an inclined board 11 serving to close the opening between the end of the alley 1 and the conveyor 4. To make sure that all pins will be removed, the conveyors 7 are provided with upstanding lugs 7ª, Fig. 2, which serve to engage the ends of any pins that may be lying partly on the edge of the alley and overlying the edge of the conveyor. At either side of the conveyor 4, Figs. 1, 2, is an inclined surface 12 to facilitate the transfer of balls and pins from the conveyor 7 to conveyor 4.

In the rear end of the pit 3, Figs. 1, 2, is a ball and pin elevating and distributing mechanism comprising a pair of sprocket wheels 12, and cooperating pairs of sprocket wheels 13, 14, overhead on suitable supports 15, 16, one only of each wheel being shown, and a plurality of chains 17 travelling thereover in the direction of the arrows. These chains are provided at intervals with cross slats or strips 19, 20, from the outer face of the former of which project pin-carrying studs 21, while the latter strip acts as a back or support for the pins and balls during their travel on the chains. The chains 17, Fig. 1, are driven by sprocket 13, the shaft 34 of which, in turn, is driven from any suitable source of power, not shown.

As the pins and balls are carried by the conveyor 4 to the chains 17, they sometimes become positioned irregularly, and in more or less confusion. To ensure that the pins will eventually rest on the studs 21 in proper position while being raised, Fig. 1, I have conceived the novel construction whereby the mechanism is provided with a pin-positioning board 23 hinged at 24 to suitable supports, as a partition or wall 25 between the paths of the chains, or upon a sheet of flexible material 26, as canvas or leather having one edge secured to the outer edge of the board while its opposite edge is secured to the wall 25.

This board normally hangs, Fig. 1, between the chains 17 across the upward path of the studs 21 and when a pin comes up in proper position, Fig. 1, it simply raises the shelf and passes upwardly past the same. But if the pin is mispositioned, its contact with the board will cause the pin either to position itself properly as in Fig. 1, parallel with the strips 19, or fall off into the pit, to be picked up later by the studs 21. There is, obviously, no trouble with the balls, as they can lie in but one position.

This board 23 for positioning the pins is located just above the pit, and a similar board 27 is provided just above the former for delivering the balls to a chute 28 leading to the track 2 for the return of the balls to the bowler. On the board 27, however, is placed a suitable weight 29, or its equivalent, to assist the board in forcing the ball off the pins 21 into the chute by exerting a downward and outward pressure or squeezing effect upon it.

For receiving the pins from the elevator, I provide above the chute 28 a pin-receiving shelf or magazine 30 which may be conveniently suspended as by hangers 31, 32, with its rear edge adjacent the elevator 17 so that as the pins 21 travel upwardly and forwardly over the idler sprocket 33 to the sprocket 13 on the shaft 34, the pins roll off naturally into the magazine 30 from which they are taken as required by the pin boy whose position will be referred to later. If a pin should accidentally fall from the elevator or magazine it would strike the apron 26 and, if the latter were slack, or if the board were being raised by one of the strips 19 or 20, a pin would rest in the pocket and allow the board to be raised upright by the board 19 or 20, for the latter to pass by, and the apron or pocket would rest in the cut away portion in the wall 25 without doing any damage.

Also suspended from the supports 31, 35, or by any other suitable means, Figs. 1, 4, is the pin box plate 36, for the pin boxes 37 and through which the latter are suspended and by which they are positioned exactly over the pin spots on the floor of the alley 2. On these same supports 31, 35, Fig. 4, and below the pin box plate, is a platform 38 which may aid in supporting the plate 36 and also provide a place for the pin boy to stand, his position being near either the circle $a$ or $b$ according to whether the next alley is at the left or right of the alley in Fig. 4, the boy ordinarily attending to two alleys.

The pin boxes 37, see Figs. 5, 6, are long and of an internal dimension a little larger than the diameter of the pins, providing a working fit, and they extend, Fig. 1, from above plate 36 down through the platform 38. Each box, Figs. 1, 4, 5, 6, is supported by a rope 39, leading from the top of the box rearwardly over a pulley 40 on the plate 36 and a second pulley 41, Figs. 1, 4, on a support 42 beneath the pin magazine, and carrying a counterbalance weight 43 on its other end, the weight being sufficient to balance safely the box and its contained pin.

Each pin box, Figs. 4, 5, has within it a pin-supporting shelf 44 hinged to one side wall of the box and held in position by a cord 45, one end of which is attached to the shelf, while the opposite end, after being carried over a pulley (not shown) in the opposite side wall of the box at the top, is carried down and secured to the platform 38. A second cord 46 is attached to the first cord intermediate its ends and also to the box plate to support the former cord when relieved of the weight of the box.

By this novel means, when the box is in normal position, Figs. 1, 4, 5, 6, the cord 45 will be taut and will hold the shelf 44 in position with the pin thereon. When the box is lowered, as will be described presently, the cord will of course cease to support the shelf, permitting the pin simultaneously to drop to a slide 47 carried in a channel 48 in a bracket-like member 49, on the side of the box. This slide has in it a slot 50 and the bracket, Fig. 6, has a channel 51, and through the slot and channel slide a movable rod 52 having both its lower and upper ends bent laterally.

When the box 37 is nearly down to the alley, the bent upper end of the rod 52 strikes a post 522 on the platform and the rod is pushed up through the slot in the slide 47 and the contact therewith of the lower bent rod end moves the slide laterally across the box and to the right, Fig. 5, allowing the pin to drop to the alley in its proper position. By first permitting the pins to drop to the slide 49 while the box is descending, much noise is avoided which would be made if the pins initially dropped to the slide 47 and the shock to the slide 47 is lessened and danger of splitting the same avoided. When the box is raised, the upper end of the rod 52 will strike the plate 36 first, pushing the rod downwardly a short distance and, by its angular contact with the slide 47, pushing the latter to the left, Fig. 5, partly closing the box and ready to again receive the next pin.

To ensure vertical travel of the box and consequent accurate positioning of the pin thereby, each box is provided on one face thereof, Fig. 6, with one or more, herein two, grooved blocks 53 which engage and slide upon a guide or track 54, see also Fig. 6a, secured to the plate 36 and platform 38.

Each of the box-supporting cords 39, Figs. 1, 4, 8, passes through an opening in a pull bar 55, and secured on each cord, and resting against the forward face of the pull bar is a collar 56 so that, by pulling the bar 55 forwardly, each cord 39 will be pulled forwardly, raising its weight 43 and lowering its box 37 with the pin therein, the pin first dropping to the slide 47 and then to the alley as already described. According to the rules of the candle pin game as usually played, any ball that comes to rest on the alley or in the gutter in advance of the foul line 566, is a foul, and any pin that is knocked down and rests in advance of such line must be removed from the alley and reset before the next ball is bowled. In such case the pin boy knocks the ball or pin into the gutter with a rod and resets the pin. In order that the resetting of a single pin may be done conveniently, particularly with respect to the pins in the last two rows of boxes which are close to or quite beneath the magazine, each collar 56, Fig. 4, is provided with an additional and independent cord 567 leading to the plate 36, and by pulling this cord any selected box conveniently may be caused to drop and deposit its pin on the desired spot on the alley without reaching in beneath the magazine. These cords 567 may terminate at screweyes 568 on the plate 36 or may be carried as far forward as may be desired.

For operating the mechanism for the alley sweeper and the pin boxes, Figs. 1, 7, I provide on the hangers 31, 35, the bar 57, and on this bar is mounted the control mechanism, including a shaft 58, Figs. 1, 9, 10, carrying on one end a fixed clutch disk 59 with holes or sockets 60 therein, and opposite to it, and loose on the shaft, is a cooperating clutch pulley 61, Figs. 10, 11, with a stud 611 on its face to engage the sockets 60, each of these members, Fig. 11, being recessed at the hub to receive a spring 62, normally holding the two members apart.

Pivoted to the pulley 61 by pins 63 are the two yoke arms 64, Figs. 9, 11, of a clutch lever 65, by means of which the pulley may be caused to slide on the shaft 58 to engage the disk 59 and away from the same. Below the lever 65, Figs. 9, 13, and on the bar 84 is pivoted a pawl 66, one end of which, Fig. 13, has a notched edge 67, which, under the pressure of the spring 68 is caused to engage the lever arm 65 when the latter is moved laterally to lock the clutch or to throw the pulley in engagement with the disk 59, the pawl preventing the lever from moving back again and holding the clutch in locked position.

On the opposite end of this shaft, Fig. 7, is a drum 69 fast thereto, and to which is secured one end of a cord 70 running over an idler pulley 71 on a suitable support, the opposite end of the cord being secured to the end of an arm 72 adjacent the pulley and to be described. On the shaft 58, Figs. 1, 7, is also a sprocket 73 carrying a chain 74 which also runs over a sprocket 75 on a shaft 76, on the platform 38 for operating the alley sweeping device. This device comprises a rack 77 fast on the shaft 76 and having hinged at its forward edge a second rack 78 carrying at its lower edge an angularly positioned strip 79 resting, when lowered, on the alley floor.

When the shaft 76 is rotated by the chains 74 from shaft 58, the sweeper is caused to swing downwardly and rearwardly of the alley, Fig. 1, sweeping the pins before it into the pit, the racks 77, 78, separating at their hinged edges, as may be necessary to permit such action, see dotted lines, Fig. 1. This device is returned to normal position automatically, and for this purpose there is provided the arm 72 adjacent the pulley 69 referred to, Figs. 1, 7, on the shaft 58, the arm carrying a suitable weight 80. The rope 70 is wound upon the drum 69 and the arm 72 and weight 80 raised when the sweeper is swung downwardly, and when released by means to be described, the weight swings downwardly, unwinds the rope 70 on drum 69 and returns the sweeper to normal position.

For lowering the pin boxes immediately after the pin sweeper has cleared the alley, and while it is returning to normal position, I have provided the following novel mechanism.

On the bar 57, or other suitable support extended from the support 35 to the support 31, Figs. 1, 9, 10, is a shaft 81, carrying on one end a clutch disk 86 fast thereon with apertures 87 in its face, and a clutch pulley 88 carrying on its face a stud 89 to engage the apertures in the disk 86, the disk and pulley being of same construction as the disk 59 and pulley 61 already described, and normally separated likewise by a spring 90. Over this pulley, Figs. 1, 10, runs a chain or belt 91 by means of which the pulley is operated from a pulley, not shown, on the drive shaft 34.

On the shaft 81 also are sprockets 92 over which runs chains 93 to the ends of the pull bar 55. The opposite ends of these chains carry counterweights 933 over pulleys 934 to substantially balance the weight of the pulling bar 55. When the shaft 81 is rotated by the clutch pulley 88 the bar 55 is drawn forward and the boxes lowered. For controlling the operation of this shaft and pulley to drop the pin boxes and raise them in cooperation with the pin sweeping shaft 58, I have provided the following construction.

On the bar 57 and, Fig. 9, the platform 38, are provided straps 94, the strap on the platform not being shown, and beneath these straps slides a clutch controlling bar 95 carrying at its lower end two cam rolls 96, 97, so positioned as to be engaged by a cam 98 on the shaft 76. By means of a hump 99 on the cam, this bar 95 is given a vertical reciprocating motion. On its upper end the bar has a pin 101 adapted to engage the end 102 of the pawl 66 to trip it as the bar goes up and disengage the pawl from engagement with the shipper lever 65 to allow the spring 62 to swing the lever 65 and slide the clutch pulley 61 on the shaft 58 to disconnect the pulley from the disk 59. On its upper end this bar 95 carries also a bevelled trip member 104 to engage a latch 105 hinged to swing downwardly against the spring 106 on the clutch lever 107 pivoted at 108 to the bar 57 and pivotally connected also to the hub 109 of the clutch pulley 88.

The trip member 104 is timed to engage the latch 105 to move the lever 107 to throw the pulley clutch 88 into engagement with the disk 86 to rotate the shaft 85 and drop the pin boxes 37 immediately after the pin 101 trips the pawl end 102, and while the pin sweeper is being returned to normal position by shaft 58 and its clutch pulley 61 unlocked from the disk 59 by the pawl 102.

As the lever 107 is moved laterally, the lever 109 on bar 57 is drawn down against the lever 107 by the spring 110 so that the lever is locked in position, to keep the clutch pulley in engagement with the disk 86. The lever 109 is connected by a rod 111 with a lever 112 on the member 31. When the boxes 37 are lowered and the pull bar 55 is drawn forward, it engages the upper arm of lever 112, and through the link 111 lifts the lever 109 from engagement with the clutch bar 107 releasing the clutch pulley from the disk 86 and stops further movement of the shaft 81 and permitting the weight 43 to raise the boxes 37.

The operation of my novel pin setting mechanism is as follows: After the bowler has rolled the proper number of balls the pin boy on the platform 38 grasps the lever 65, throws the clutch pulley 61 into engagement with the disk 59 and through the chain 74, sprocket 75 and shaft 76 causes the sweeper 78 to sweep all pins and balls remaining on the alley on to the conveyor from which they are elevated by the conveyor 17 to the ball chute 28 and pin magazine 30.

By the time that the sweeper 78 has been returned to normal position by the weight 80 already described, the clutch bar 95 has ascended until the lever 65 has been released by the engagement of the pin 101 with the pawl arm 102, and the lever 107 has been engaged by the bevelled face of the trip 104 through the latch 105 and thrown outwardly, throwing the clutch pulley 88 into engagement with the disk 86 and causing the rotation of shaft 81, lowering the boxes 37 and positioning the pins on the alley ready for the next bowler.

There is kept on hand in the pin magazine extra pins so that the operator always has a sufficient number to use without waiting for the pins to be returned by the chains 17 from the pit. One pin boy can readily in this way care for two alleys, the platform being between them.

My novel apparatus is so compact in construction that it may be installed within a space equal in width to one alley and ball track.

The use of pin setting mechanism removes all danger of injury to the pin boy, results in a uniformly accurate setting of the pins, and resets them more quickly than any boy can do it. My novel mechanism ensures the elevating of the pins in proper position so that there is no danger of wedging them while mispositioned against the ball chute 28, no danger from their falling while mispositioned, from near the top of the elevator, to the pit, sets the pins securely owing to the substantial support given the pins by the boxes about them when they are dropped even though the bottoms may be uneven, and the pins may be used longer with uneven bottom ends without refinishing for this reason. This mechanism is free from the danger of dropping pins through insecure jaws such as are sometimes used, and is particularly adapted for use in connection with candle pins in which game all the dead pins is in the rear of the foul line are left on the alley until each bowler has finished his turn.

However, my mechanism can obviously be used with pins of different shape and size by simply making the boxes of proper size and if it is desired to use it in games where the dead pins are removed after each ball has been rolled, the alley can be swept clear and the standing pins reset by the boy before the next ball is rolled.

My invention is not restricted to the particular embodiment thereof herein disclosed.

Claims—

1. Pin setting apparatus comprising alley sweeping mechanism, longitudinally acting pin conveying mechanism to receive the pins from the sweeping mechanism, pin elevating means, a pin magazine, a group of individually and collectively operable pin setting boxes, means to lower the boxes and pins, and to set the pins therefrom.

2. Pin setting apparatus comprising alley sweeping means, pin elevating means, a pin magazine, a group of individually operable pin setting boxes, and means to lower the boxes and set the pins therefrom.

3. Pin setting apparatus comprising alley sweeping means, pin conveying means at the side of the alley, pin elevating means, a pin magazine, a group of pin setting boxes, operable automatically as a group and singly by hand and means to lower the boxes and to drop the pins therefrom.

4. Pin setting apparatus comprising hinged alley sweeping means, pin elevating means, a pin magazine, a group of pin setting boxes, and means for setting the pins therefrom step by step.

5. Pin setting apparatus comprising alley sweeping means, pin elevating means comprising a chain and sprockets therefor, pin and ball carrying members on the chain, pin positioning boards in the path of the pins, ball delivering boards also for the chain, a pin magazine so positioned that the pins drop from the elevator to the magazine.

6. Pin setting apparatus comprising alley sweeping means including a multi-part rack hinged above the alley and arranged to sweep thereover, a pin and ball conveyor to receive the pins and balls from the sweeper, an elevator having pin carrying studs, a hinged ball delivering rack in the path of the elevator adapted to press on the ball as it passes to force it from the elevator.

7. In pin elevating mechanism, an endless carrier, and a hinged pin positioning member adjacent the carrier constructed and arranged to position horizontally the pins thereon.

8. In pin and ball elevating means, an endless carrier, pin and ball holding members thereon, and movable ball delivering means adjacent the carrier for pushing the ball therefrom.

9. In pin setting mechanism, a plate, a plurality of boxes thereon, a pull bar therefor, counterweights therefor, a pulley, connections between the pulley, bar, driving shaft, and boxes for lowering the latter.

10. In pin setting mechanism, a plate, pin boxes therein, counterweights for the boxes and a pull bar for said weights, a shelf in the pin box, a support, a cord anchored thereto and supporting said shelf, a slide also in the pin box, the shelf arranged to drop while the box drops for delivering the pin to the slide, and means automatically moving the slide to drop the pin when the box approaches the alley.

11. Pin setting mechanism comprising a plate, a plurality of pin boxes therein, counterweights for the boxes, a pull bar, a counterweight therefor and a pin supporting shelf in the box constructed and arranged to drop the pin to a pin slide when the box is lowered.

12. Pin setting mechanism comprising a plate, pin boxes therein, counterweights therefor, a pull bar and counterweight therefor, a pin supporting shelf in the box, a pin supporting slide also in the box and means for dropping the pin first to the slide and subsequently to the floor while the pin box is lowered to the floor.

13. Pin setting mechanism comprising pin sweeping mechanism, a plate, pin boxes therein, counterweights therefor, a pull bar and counterweight therefor, a pin supporting shelf in the box, a pin supporting slide also in the box and a member suspending the shelf in the box and constructed and arranged to release the slide while the box is being lowered, and automatic means to stop the sweeping mechanism and lower the boxes while the sweeping mechanism is in operation.

14. Pin setting mechanism comprising pin sweeping means, and a plate, pin boxes therein, cords suspending them, and suspended shelves therein for the pins, slides also for the pins, pin box lowering means, means including a plurality of pulleys and clutch disks for operating the sweeping and box lowering means, and a cam, a clutch bar in operative relation thereto, and automatic means for releasing the sweeping means pulley and engaging the pin box lowering pulley for throwing one out of and the other into operative relation.

15. Pin setting apparatus comprising alley sweeping means including a multi-part rack hinged above the alley and constructed and arranged to sweep thereover, a pin and ball conveyor and a gutter conveyor to receive the pins and balls from the sweeper, an elevator having pin holding studs, and a hinged ball delivering rack in the path of the elevator adapted to force the ball off the elevator.

16. Pin setting apparatus comprising alley sweeping mechanism, pin conveying mechanism to receive the pins from the sweeping mechanism, pin elevating means, a pin magazine, a group of shelf and slide carrying pin setting boxes, means to lower the boxes and pins, and to set the pins therefrom by intermittent action, and a platform above the alley for the pin boy.

17. In pin setting apparatus, the combination with the floor 1 of the hinged alley sweeper 77 thereover and means for operating it, the longitudinal gutter conveyor 7, the conveyor 4 hinged to the floor 1, the elevating member 17 carrying the strips 19, 20 with studs 21 thereon, and the pin positioning board 23 in cooperative relation thereto.

18. In pin setting mechanism, the combination of the elevating chains 17 having strips 19, 20 thereon with studs 21, the rotative members 12, 13, 14 for the chains 17, the support 25 adjacent said chains, positioning boards 23, 27 on said support, and the chute 28 and magazine 30 in operative relation to the chains 17.

19. In pin setting mechanism, the combination with pin elevating means and a pin magazine, of the pin box plate 36, boxes 37 therein, ropes 39 suspending the same, counterweights 43 for the boxes, the pull bar 55 in operative relation with the ropes 39 for actuating the boxes collectively and permitting individual operation of selected ropes, the shelf 44 in the box 39, the supporting ropes 45, 46 therefor, the slide 47 in the box, rod 52 having bent ends and in operative relation to the slide, and the post 522 for said rod.

20. In ball elevating means, a flexible carrier, ball holding members thereon, and movable ball delivering means in the path of the ball to deliver the ball from the holding members.

21. In pin and ball elevating means, a flexible carrier, pin and ball holding members thereon, and movable and selectively weighted pin positioning and ball delivering means to position the pins on the holding members, and to deliver the ball therefrom at the proper point.

In testimony whereof, I have signed my name to this specification.

JOHN F. MURPHY.